United States Patent
Keller et al.

(10) Patent No.: US 9,432,928 B1
(45) Date of Patent: Aug. 30, 2016

(54) BASE STATION IMPLEMENTED ACCESS CONTROL BASED ON PUBLIC LAND MOBILE NETWORK IDENTITY

(71) Applicant: Sprint Spectrum L.P., Overland Park, KS (US)

(72) Inventors: Gregory S. Keller, Sterling, VA (US); James McDonough, Herndon, VA (US); Alex Shusterman, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 245 days.

(21) Appl. No.: 14/095,497

(22) Filed: Dec. 3, 2013

(51) Int. Cl.
*H04W 48/20* (2009.01)
*H04W 36/00* (2009.01)
*H04W 48/10* (2009.01)
*H04W 48/06* (2009.01)

(52) U.S. Cl.
CPC ......... *H04W 48/20* (2013.01); *H04W 36/0005* (2013.01); *H04W 48/06* (2013.01); *H04W 48/10* (2013.01)

(58) Field of Classification Search
CPC ............... H04W 36/0005; H04W 36/0077; H04W 36/0083; H04W 36/0022; H04W 8/04; H04W 8/082; H04W 8/186; H04W 8/16; H04W 48/06; H04W 48/10; H04W 48/20; H04W 12/06; H04W 12/10
See application file for complete search history.

(56) References Cited

U.S. PATENT DOCUMENTS

| | | | |
|---|---|---|---|
| 6,038,455 A | 3/2000 | Gardner et al. | |
| 6,104,927 A | 8/2000 | Willey | |
| 6,253,088 B1 | 6/2001 | Wenk et al. | |
| 6,563,809 B1 | 5/2003 | Proctor, Jr. et al. | |
| 7,174,152 B1 | 2/2007 | Oleniczak et al. | |
| 7,206,593 B1 | 4/2007 | Yarkosky et al. | |
| 7,477,920 B2 | 1/2009 | Scheinert et al. | |
| 7,519,077 B2 | 4/2009 | Beathard | |
| 7,636,322 B1 | 12/2009 | Gandhi et al. | |
| 7,848,282 B2 | 12/2010 | Padovani et al. | |
| 7,974,241 B2 | 7/2011 | Aaron | |
| 8,040,803 B1 | 10/2011 | Pawar et al. | |
| 8,041,819 B1 | 10/2011 | Bhalla et al. | |
| 8,107,438 B1 | 1/2012 | Singh et al. | |
| 8,204,000 B1 | 6/2012 | Srinivas et al. | |
| 8,249,498 B1 | 8/2012 | Pulugurta | |

(Continued)

FOREIGN PATENT DOCUMENTS

| | | |
|---|---|---|
| WO | WO 00/65863 | 11/2000 |
| WO | WO 01/47288 | 6/2001 |
| WO | WO 2011/143815 | 11/2011 |

OTHER PUBLICATIONS

U.S. Appl. No. 13/860,275, filed Apr. 10, 2013.

(Continued)

*Primary Examiner* — Habte Mered

(57) ABSTRACT

A method and corresponding apparatus and system for base station implemented access control based on public land mobile network (PLMN) identity. When a base station receives a request to serve a mobile terminal, the base station will determine the mobile terminal's PLMNid and will decide based on that PLMNid whether to permit or deny the request for service. If the base station thereby decides to permit the request for service, then the base station may process the request in a normal manner. Whereas, if the base station thereby decides to deny the request for service, then the base station may reject the request outright.

13 Claims, 4 Drawing Sheets

(56) References Cited

U.S. PATENT DOCUMENTS

| | | |
|---|---|---|
| 8,606,219 B1 | 12/2013 | Barbee et al. |
| 2001/0007552 A1 | 7/2001 | Schiff et al. |
| 2004/0049699 A1 | 3/2004 | Griffith et al. |
| 2004/0259570 A1 | 12/2004 | Wan et al. |
| 2005/0075129 A1* | 4/2005 | Kuchibhotla ......... H04W 48/18 455/552.1 |
| 2005/0097356 A1 | 5/2005 | Zilliacus et al. |
| 2005/0117540 A1* | 6/2005 | Kuchibhotla ....... H04W 76/021 370/329 |
| 2007/0037577 A1 | 2/2007 | Dalsgaard et al. |
| 2007/0076696 A1 | 4/2007 | An et al. |
| 2007/0178906 A1 | 8/2007 | Gao et al. |
| 2007/0242702 A1 | 10/2007 | Shim |
| 2007/0256135 A1 | 11/2007 | Doradla et al. |
| 2008/0026715 A1 | 1/2008 | Gao |
| 2008/0049706 A1 | 2/2008 | Khandekar et al. |
| 2008/0066161 A1 | 3/2008 | Ohhira |
| 2008/0085699 A1 | 4/2008 | Hirano et al. |
| 2009/0086629 A1 | 4/2009 | Zhang et al. |
| 2009/0170547 A1 | 7/2009 | Raghothaman et al. |
| 2009/0203381 A1 | 8/2009 | Ueda |
| 2009/0257361 A1 | 10/2009 | Deshpande et al. |
| 2009/0280836 A1 | 11/2009 | Chou |
| 2009/0285159 A1 | 11/2009 | Rezaiifar et al. |
| 2010/0041372 A1 | 2/2010 | Linkola et al. |
| 2010/0203865 A1* | 8/2010 | Horn ..................... H04W 48/16 455/411 |
| 2010/0214956 A1 | 8/2010 | Law et al. |
| 2011/0201335 A1 | 8/2011 | Garrett et al. |
| 2011/0275369 A1 | 11/2011 | Bartlett et al. |
| 2011/0305197 A1 | 12/2011 | Park et al. |
| 2012/0003959 A1 | 1/2012 | Gonzalez-Canedo et al. |
| 2012/0020204 A1* | 1/2012 | Morera ................. H04W 48/18 370/217 |
| 2012/0030110 A1 | 2/2012 | Prakash et al. |
| 2012/0088472 A1* | 4/2012 | Pison ................... H04W 88/10 455/411 |
| 2012/0116886 A1 | 5/2012 | Manku |
| 2013/0045706 A1 | 2/2013 | Hsu |
| 2013/0053033 A1* | 2/2013 | Jokinen ............. H04W 36/0061 455/436 |
| 2013/0090124 A1 | 4/2013 | Panchal et al. |
| 2013/0203414 A1* | 8/2013 | Zong ..................... H04W 60/00 455/435.1 |
| 2013/0273887 A1* | 10/2013 | Hole ..................... H04W 36/08 455/411 |
| 2013/0273917 A1 | 10/2013 | Sfar |
| 2013/0294395 A1* | 11/2013 | Pison ................... H04W 12/08 370/329 |
| 2014/0010203 A1* | 1/2014 | Zhang .................. H04W 48/02 370/331 |
| 2014/0362775 A1* | 12/2014 | Steiner ............... H04W 76/045 370/329 |
| 2014/0370894 A1* | 12/2014 | Hosdurg ........... H04W 36/0077 455/436 |
| 2015/0092654 A1* | 4/2015 | Ahmavaara ........... H04W 48/16 370/312 |
| 2015/0117400 A1* | 4/2015 | Gopal ............... H04W 36/0055 370/331 |
| 2015/0208293 A1* | 7/2015 | Zhang .................. H04W 48/18 455/433 |
| 2015/0237495 A1* | 8/2015 | Zhang .................. H04W 8/186 455/422.1 |

OTHER PUBLICATIONS

U.S. Appl. No. 13/605,683, filed Sep. 6, 2012.
Office Action from U.S. Appl. No. 13/605,683, dated Dec. 26, 2012.
Office Action from U.S. Appl. No. 13/605,683, dated Aug. 15, 2013.
Office Action from U.S. Appl. No. 13/605,683, dated Oct. 29, 2013.
First Action Interview Pilot Program Pre-Interview Communication from U.S. Appl. No. 13/860,275, dated Apr. 2, 2015.
3rd Generation Partnership Project 2 "3GPP2", "Upper Layer (Layer 3) Signaling Standard for cdma2000 Spread Spectrum Systems," 3GPP2 C.S0005-E, Version 3.0, Jun. 2011.

* cited by examiner

BASE STATION IMPLEMENTED ACCESS CONTROL BASED ON PUBLIC LAND MOBILE NETWORK IDENTITY

BACKGROUND

Unless otherwise indicated herein, the materials described in this section are not prior art to the claims and are not admitted to be prior art by inclusion in this section.

In a typical market area, wireless service providers may operate radio access networks (RANs) each arranged to provide mobile terminals with wireless communication service. Each such a RAN may include a number of base stations that radiate to define wireless coverage areas in which to serve mobile terminals according to a radio access technology such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1×RTT and 1×EV-DO), GSM, GPRS, UMTS, EDGE, iDEN, TDMA, AMPS, MMDS, WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a mobile terminal within coverage of the RAN may engage in air interface communication with a base station and may thereby communicate via the base station with various remote network entities or with other mobile terminals served by the base station or by other base stations.

A wireless service provider may operate one or more such RANs as a public land mobile network (PLMN) for serving mobile terminals. For example, a service provider may operate a CDMA RAN as a PLMN for serving mobile terminals with CDMA service, and/or the service provider may operate an LTE RAN as a PLMN for serving mobile terminals with LTE service. In general, each such PLMN may have a respective PLMN identifier (PLMNid), and mobile terminals may subscribe to service of the PLMN be provisioned with data indicating that PLMNid.

In addition to operating a RAN as its own PLMN, a wireless service provider may also operate a RAN on behalf of one or more other wireless service providers known as "mobile virtual network operators" (MVNOs), to allow the MVNOs to provide wireless communication service without the need to build out RANs of their own. (In practice, an MVNO may be a different company than the actual RAN operator or may be the same company as the actual RAN operator.) In this arrangement, the MVNO may be considered to provide an MVNO PLMN, which may have its own PLMNid. However, the wireless service provider would in fact be operating its RAN not only as its own PLMN but also as the MVNO's PLMN. In addition, a wireless service provider that functions as an MVNO using the RAN of another service provider may also operate its own RAN in certain locations, and may in fact host service for the other service provider in certain locations, such that the other service provider would then function as an MVNO in those locations.

Still further, a wireless service provider may have roaming agreements with other wireless service providers, to provide a wider range of coverage for mobile terminals. In such arrangements, a mobile terminal that subscribes to service of a service provider's PLMN but is not within sufficient coverage of that PLMN may instead be served by another service provider's PLMN, and the service providers may work with each other to account for the costs of that roaming service.

In practice, base stations of a given RAN may therefore provide service for possibly multiple PLMNs. For instance, a base station operated by a wireless service provider may provide service for a PLMN of that service provider and may also provide service for a PLMN of an MVNO, and perhaps for a PLMNs of various roaming partners.

OVERVIEW

It may be desirable in some scenarios to control which mobile terminals will be allowed to access the service of base stations in a given RAN or to control which PLMNs certain mobile stations will be allowed to access. One way to provide such control is to have a centralized network entity, such as a switch or a mobility management entity (MME), check the PLMNid of a mobile terminal that is seeking to access a given base station, and have that centralized network entity either grant or deny authorization of service for the mobile terminal based on that PLMNid. Unfortunately, however, that type of centralized control may not permit application of different access control rules per base station or based on factors such as which PLMN of a base station a mobile terminal seeks to access.

Disclosed herein is a method and corresponding apparatus and system to provide improved access control based on PLMNid, by having a base station itself implement PLMNid-based access control. In accordance with the disclosure, when a base station receives a request to serve a mobile terminal, the base station will determine the mobile terminal's PLMNid and will decide based on that PLMNid whether to permit or deny the request for service. If the base station thereby decides to permit the request for service, then the base station may process the request in a normal manner. Whereas, if the base station thereby decides to deny the request for service, then the base station may reject the request outright.

For example, when a mobile terminal transmits to a base station an attach request seeking to register for service with the base station, the base station may read the mobile terminal's PLMNid from the attach request and refer to a PLMNid-based access control list (e.g., whitelist and/or blacklist) to determine whether to service of a mobile terminal with that PLMNid is permitted, then the base station may process the attach request as normal, such as by forwarding the request to a centralized entity for further validation of the mobile terminal. Whereas, if the base station thereby determines that service of that PLMNid is not permitted, then the base station may responsively transmit to the mobile terminal a denial of the attach request rather than forwarding the attach request for normal processing.

Further, the base station in this example may operate on multiple frequency bands, each of which may provide service for one or more particular PLMNs, and the base station may implement a separate PLMNid-based access control list for each frequency band. In that case, when the mobile terminal transmits to the base station an attach request, the mobile terminal may do so on one of the frequency bands, and the base station may select and apply the corresponding PLMNid-based access control list to determine whether the mobile terminal's PLMNid is permitted. Thus, depending on the frequency band on which the mobile terminal requests service, and depending on the PLMNid of the mobile terminal, the base station may permit further processing of the mobile terminal's attach request or may deny it outright.

As another example, when a mobile terminal is served by a first base station and the first base station transmits to a second base station a handoff request to facilitate handoff of the mobile terminal from being served by the first base station to being served by the second base station, the second base station may read the mobile terminal's PLMNid from the handoff request and may similarly refer to a PLMNid-based access control list to determine whether to permit service of the mobile terminal with that PLMNid. If the second base station thereby determines that service of that PLMNid is permitted, then the second base station may process the handoff request as normal, such as by engaging in handoff preparation. Whereas, if the second base station thereby determines that service of that PLMNid is not permitted, then the second base station may responsively transmit to the first base station a denial of the handoff request rather than processing the handoff.

Accordingly, in one respect, disclosed is a method operable by a base station. In accordance with the method, the base station receives a request for the base station to serve a mobile terminal that subscribes to a PLMN, with the request specifying a PLMNid of that PLMN. The method then involves the base station determining the PLMNid specified by the request and the base station making a determination of whether that PLMNid is allowed, i.e., whether to permit service of a mobile terminal that has that PLMNid. In turn, the method involves the base station granting the request to the serve the mobile terminal only if the determination is that the determined PLMNid is allowed. For instance, only if the base station determines that the determined PLMNid is allowed, the base station may engage in normal processing of the request, which may lead to granting of the requested service. Whereas, if the base station determines that the determined PLMNid is not allowed, then the base station may deny the request outright without continuing with normal processing of the request.

Optimally to facilitate this process, the base station may be provisioned with a PLMNid access control data, such as a PLMNid whitelist (specifying one or more allowed PLMNids) and/or a PLMNid blacklist (specifying one or more disallowed PLMNids). Thus, when the base station receives the request to serve the mobile terminal, the base station itself may refer to that PLMNid access control data and may determine whether the mobile terminal's PLMNid is whitelisted or blacklisted, and thus whether the PLMNid is allowed. By tailoring such PLMNid access control data, a service provider can thereby enable various individual base stations to allow or disallow service of particular PLMNids and can provide different extents of such control for different base stations, such as different PLMNid-based access control for different frequency bands for instance.

In another respect, disclosed is a base station that includes an antenna structure configured to communicate over an air interface with mobile terminals, and a controller (e.g., a programmed processing unit) that is configured to carry out various functions described herein. For instance, the control may be configured to receive a request to serve a mobile terminal that subscribes to a PLMN, with the request specifying a PLMNid of that PLMN. Further, the controller may be configured to refer to PLMNid access control data to make a determination of whether the specified PLMNid is allowed. And the controller may be configured to grant the request only if the determination is that the specified PLMNid is allowed (e.g., provided other conditions are met as well).

Still further, disclosed is a communication system, such as an LTE network for instance, that includes an eNodeB (e.g., an LTE base station) and an MME. The eNodeB has an antenna structure for communicating wirelessly with mobile terminals, a processing unit, data storage, and program instructions stored in the data storage and executable by the processing unit to carry out various functions. And the MME is in network communication with the eNodeB and with a home subscriber server (HSS) with which the MME may communicate to facilitate authorizing of mobile terminals seeking service.

In this communication system, when the eNodeB receives wirelessly from a mobile terminal via the antenna structure an attach request seeking to register the mobile terminal for service with the eNodeB, the eNodeB extracts from the attach request a PLMNid indicating a PLMN to which the mobile terminal subscribes, and the eNodeB makes a determination of whether the extracted PLMNid is allowed. If the eNodeB thereby determines that the extracted PLMNid is allowed, then the eNodeB forwards the attach request along to the MME for processing, and the MME works with the HSS to validate the mobile terminal for service in the system. However, if the eNodeB thereby determines that the extracted PLMNid is not allowed, then the eNodeB instead sends a denial response via the antenna structure to the mobile terminal and does not forward the attach request along to the MME for processing.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
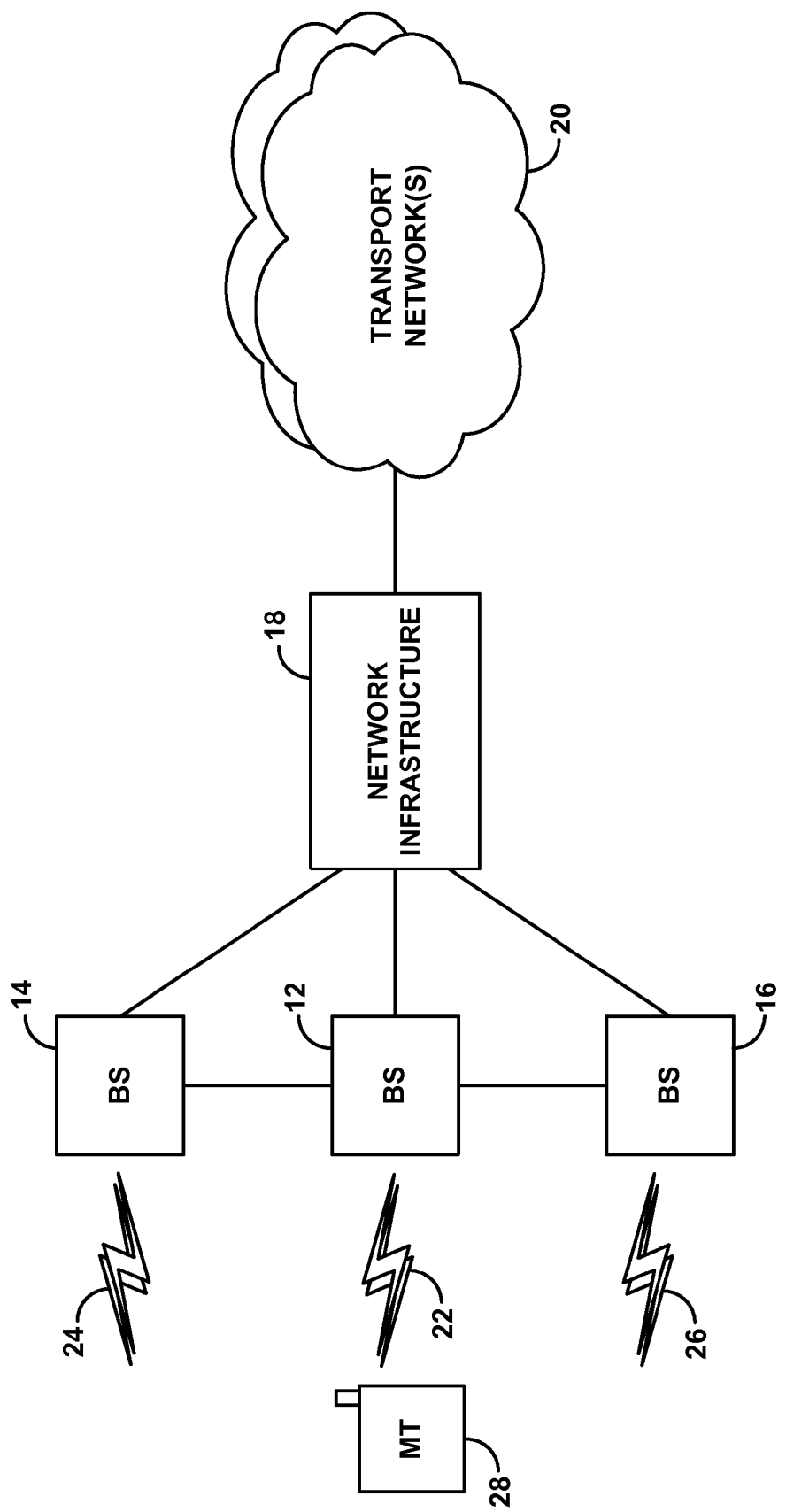
FIG. 1 is a simplified block diagram of an example communication system in which the present method can be implemented.

Referring to the drawings, as noted above, FIG. 1 is a simplified block diagram of an example communication system in which the present method can be implemented. The illustrated communication system includes multiple representative base stations 12, 14, 16 interconnected with supporting network infrastructure 18 that provides connectivity with one or more transport networks 20 such as the PSTN and the Internet. Further, each base station is shown radiating to define one or more coverage areas, each of which may operate on a particular frequency band for instance. In particular, base station 12 is shown radiating to define one or more coverage areas 22, base station 14 is shown radiating to define one or more coverage areas 24, and base station 16 is shown radiating to define one or more coverage areas 26.

Although the base stations and network infrastructure are shown as separate blocks in the figure, it should be understood that components of the system may be co-located and/or integrated together in various ways. For example, two or more base stations could share an antenna tower. And as another example, the supporting network infrastructure could be integrated with one or more of the base stations. Other variations are possible as well.

In the example system as shown, the communication system may be operated by a wireless service provider that is licensed to operate at least one PLMN for providing communication service to mobile terminals. Further, the wireless service provider may have MVNO and/or roaming agreements or the like with other service providers, according to which the communication system may provide service on behalf of those other providers as well. As a result, one or more of the illustrated base stations may provide service for one or more PLMNs. As noted above, for instance, a given base station may provide service separately on multiple frequency bands, such as one per coverage area, possibly with each frequency band providing service for more particular PLMNs. For example, the base station could provide service for the wireless service provider's own PLMN on one frequency band and for an MVNO on another frequency band, and the base station could support roaming service for still another service provider's subscribers on either or both of these bands. Further, the various base stations in the system may have different such arrangements.

FIG. 1 then further depicts an example mobile terminal 28 positioned in a coverage area 22 of base station 12. In practice, mobile terminal 28 may have a subscription with a particular one of the PLMNs. For instance, the mobile terminal may subscribe to service of the PLMN provided by the wireless service provider that operates the illustrated base stations. Alternatively, the mobile terminal may subscribe to service of a PLMN of a service provider that functions as an MVNO hosted by one or more of the illustrated base stations. Still alternatively, the mobile terminal may subscribe to service of a PLMN provided by still another service provider that may have a roaming agreement with the provider of the illustrated base stations.

The mobile terminal may be provisioned with data that specifies the PLMNid of a PLMN to which the mobile terminal subscribes. By way of example, the mobile terminal may maintain in data storage a terminal identifier that uniquely identifies the mobile terminal and that includes an indication of the PLMNid to which the mobile terminal subscribes, such as an international mobile subscriber identity (IMSI) that includes as its first six digits the PLMNid. Further, the mobile terminal may be provisioned with program logic that causes the mobile terminal to provide an indication of its PLMNid to base station when the mobile terminal seeks to be served by the base station, such as to provide the base station with the mobile terminal's IMSI including the mobile terminal's PLMNid.

The illustrated communication system may operate in accordance with a particular radio access technology such as one of those noted above. By way of example, the system may be an LTE RAN, in which case each base station may be an LTE eNodeB, and the supporting network infrastructure may include elements such as an MME, serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well.

In practice, the air interface of each coverage area in the example communication system may define a downlink or forward link for carrying communications from the serving base station to served mobile terminals, and an uplink or reverse link for carrying communications from served mobile terminals to the serving base station. Depending on the radio access technology, these air interface links may take various forms and may define various channels for carrying particular data, such as control data and bearer traffic for instance.

By way of example, each coverage area may define a pilot channel or reference channel on which the base station may broadcast a pilot signal or reference signal that mobile terminals may detect as an indication of coverage and may measure to determine coverage strength. Further, each coverage area may define a control channel that carries various overhead messages, such as system information blocks or the like, specifying characteristics and operational parameters of the coverage area. Each coverage area may also have a respective coverage area identifier, such as a Physical Cell Identity (PCI) and/or pseudo-noise offset (PN offset) for instance, which could be indicated by the pilot or reference signal or specified in another overhead broadcast message or signal.

When a mobile terminal first powers on or enters into coverage of the network, the mobile terminal may scan for pilot or reference signals and determine for each detected signal a signal level (e.g., receive strength or signal-to-noise ratio) and corresponding coverage area identifier (e.g., PCI or PN offset). The mobile terminal may thereby identify a coverage area providing the strongest pilot or reference signal and may engage in a process to register with the network by transmitting an attach request (registration request) to the base station that is providing that signal.

In the attach request, or in some other manner, the mobile terminal may convey to the base station an indication of a PLMN to which the mobile terminal subscribes. For instance, the mobile terminal may include in the attach request its IMSI, which as noted above may specify the mobile terminal's PLMNid. And the base station may then forward the attach request with that PLMNid to a centralized network entity such as an MME or MSC to facilitate authorization of mobile terminal for service.

At the time of attachment or thereafter, the mobile terminal may also engage in signaling with the base station to enter into a connected mode, in which the base station has assigned to the mobile terminal a radio link connection over which the mobile terminal can engage in bearer communication with the base station and thereby with various other entities. In that mode, for instance, the mobile terminal may engage in packet data communications on the Internet and/or a voice call on the PSTN.

While in the connected mode, the mobile terminal may then continue to regularly scan pilot or reference signals, from both the coverage area serving the mobile terminal and from various other coverage areas. Alternatively or additionally, the base station may direct the mobile terminal to engage in such scanning from time to time. As the mobile terminal carries out this scanning, the mobile terminal may thus again determine the signal level of various coverage areas, and the identities of those coverage areas.

Further, the mobile terminal may from time to time in the connected mode transmit to its serving base station a measurement report that specifies the signal level of each coverage area detected by the mobile terminal. In particular, the measurement report may specify each detected coverage area (e.g., by coverage area identifier) and the signal level (e.g., reference signal receive strength, or signal-to-noise ratio) of the coverage area as determined by the mobile terminal. In practice, a given measurement report may thus include such information for the mobile terminal's currently serving coverage area and may also include such information for each of one or more other coverage areas detected by the mobile terminal.

When the serving base station receives such a measurement report from the mobile terminal, if the measurement report specifies signal level of another coverage area, the base station or other network node may engage in a process to decide whether to trigger handoff of the mobile device to the other coverage area. In general, this process may involve evaluating the reported signal level of the other coverage area to determine whether it is sufficiently strong itself and/or whether it is sufficiently stronger than the reported signal level of the serving coverage area. Further, the process may involve consideration of other factors as well, such as load and backhaul capacity for instance.

If the serving base station decides to trigger handoff of the mobile terminal to a coverage area of another base station, the serving base station may transmit to that other base station, either over a direct inter-base-station interface or through the one or more other network entities, a handoff request message that requests the other base station to serve the mobile terminal. The other base station may then engage in a handoff preparation process to establish a radio link for the mobile terminal, and the mobile terminal may then ultimately transition to be served instead by that other base station.

In accordance with the present method, as discussed above, a base station will be configured to implement PLMNid-based access control when faced with a request to serve a mobile terminal, such as an attach request from the mobile terminal or a handoff request for the mobile terminal.

Figure 2:
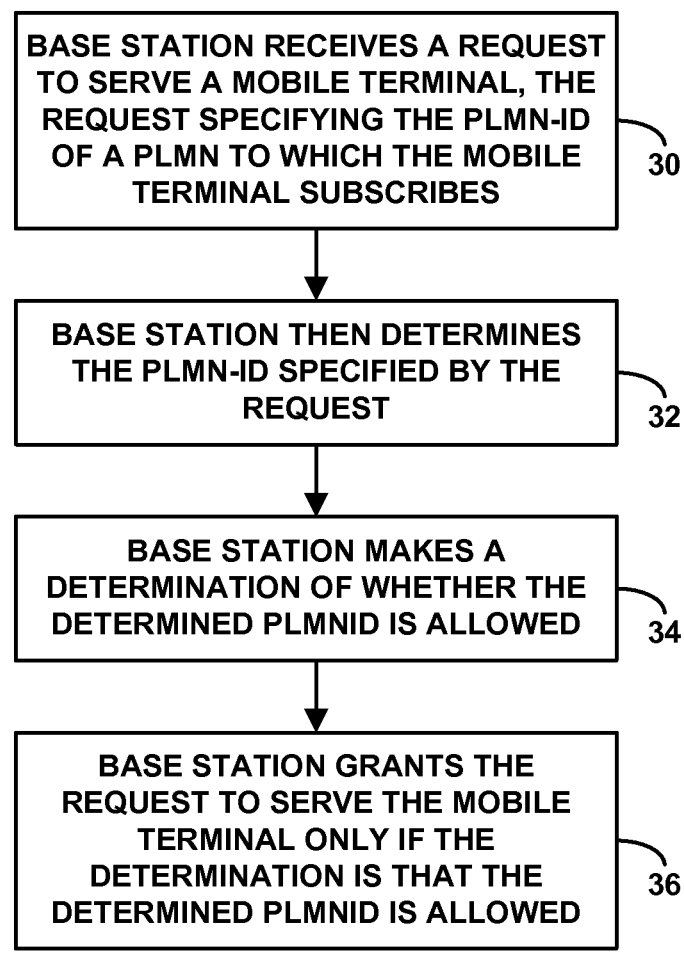
FIG. 2 is a flow chart depicting example functions that can be carried out in accordance with the method.

FIG. 2 is a flow chart depicting example functions that may be carried out by a base station in accordance with this method. As shown in FIG. 2, at block 30, the base station receives a request to serve the mobile terminal, and the request specifies the PLMNid of a PLMN to which the mobile terminal subscribes, such as by carrying an IMSI or other unique identifier of the mobile terminal that includes the PLMNid. At block 32, the base station then determines the PLMNid specified by the request, such as by reading the PLMNid from unique mobile terminal identifier carried by the request. At block 34, the base station then makes a determination of whether the determined PLMNid is allowed. And at block 36, the base station grants the request to serve the mobile terminal only if the determination is that the determined PLMNid is allowed, i.e., conditional on the determination being that the determined PLMNid is allowed.

In one implementation of this method, as noted above, the request to serve the mobile terminal can be an attach request that seeks registration of the mobile terminal for service, in which case the act of receiving the request may involve receiving the request wirelessly from the mobile terminal, into base station 12 for instance. To facilitate general authorization of the mobile terminal for service, the mobile terminal may include in such a request the mobile terminal's IMSI that includes the mobile terminal's PLMNid. Thus, upon receipt of the attach request, the base station may read the PLMNid from the attach request and apply PLMNid-based access control to determine whether to forward the attach request to another network entity for further validation and other processing or rather whether to reject the attach request outright.

To facilitate determining whether the PLMNid is allowed, the base station may maintain an access control list such as a PLMNid whitelist (listing one or more allowed PLMNids) and/or a PLMNid blacklist (listing one or more disallowed PLMNids). In practice, for instance, the base station may be provisioned with such a list by network engineers, and the list could be updated from time to time for various reasons. To make the determination of whether the determined PLMNid is allowed, the base station may then refer to the maintained access control list. For instance, if or to the extent the list is a PLMNid whitelist, the base station may determine that the determined PLMNid is allowed only if it is listed on that whitelist. Whereas, if or to the extent the list is a PLMNid blacklist, the base station may determine that the determined PLMNid is allowed as long as it is not on that blacklist.

Furthermore, as noted above, the base station may provide service on multiple frequency bands, in which case the mobile terminal may transmit the attach request on a particular one of those frequency bands and thus the base station may receive the attach request on that particular frequency band. And as noted above, the base station may maintain a separate (or separately indicated) access control list respectively for each of the frequency bands, including a particular access control list for the particular frequency band, again including data such as a PLMNid whitelist and/or a PLMNid blacklist. In that case, the base station may select the particular access control list on grounds that the attach request arrived on the particular frequency band corresponding with that particular access control list. And the base station may then refer to the selected access control list as discussed above to make the determination of whether the determined PLMNid is allowed.

In this implementation of the method, the base station may thus condition further processing of the mobile terminal's attach request on the determination being that the determined PLMNid is allowed. For instance, only if the determination is that the PLMNid is allowed, the base station may forward the attach request to a central network entity such as an MME or MSC for further validation and processing. Whereas, if the determination is that the PLMNid is not allowed, the base station may transmit to the mobile terminal, in response to the attach request, a denial of the attach request, rather than passing the attach request along for further processing. (In practice of this implementation, the base station could in theory report such a denial to another network element. But that would not be considered further processing the attach request, as attachment would be denied.)

In another implementation of this method, as noted above, the request to serve the mobile terminal can be a handoff request, in which case the base station may be a target base station, and the act of receiving the request may involve receiving the request from a source base station that is currently serving the mobile terminal. For instance, in the arrangement of FIG. 1, the mobile terminal may be currently served by base station 12, and the target base station may be base station 14, so base station 12 may transmit to base station 14, via an inter-base-station interface for instance, a handoff request.

In this implementation, the source base station may include in the handoff request to the target base station (whether in the same message or another message associated with the handoff request) a specification of the mobile terminal's PLMNid. In practice, if the source base station had received the mobile terminal's IMSI in an attach request from the mobile terminal as discussed above, the source base station could in theory have stored that IMSI in a context record for the mobile terminal and could then provide that IMSI in the handoff request to the target base station. However, if the communication system does not provide for a serving base station to maintain a record of a served mobile terminal's IMSI, the source base station could instead simply store a record of the served mobile terminal's PLMNid. At the time the source base station generates the handoff request, the source base station may then retrieve from data storage the stored record of the mobile terminal's PLMNid and may include in the handoff request a specification of that retrieved PLMNid. The source base station may specify this PLMNid in a newly defined information element in the handoff request for instance.

In this implementation as well, the base station, in this case the target base station, may maintain an access control list such as a PLMNid whitelist and/or a PLMNid blacklist, and the base station may make the determination of whether the determined PLMNid is allowed by referring to the maintained access control list to make the determination. Further, to the extent the handoff would be to a particular frequency band on which the base station provides service, the base station can similarly select one of various such PLMNid-based access control lists based on the frequency band and may refer to the selected PLMNid-based access control list to make the determination.

Here, the base station may thus condition further processing of the handoff request on the determination being that the determined PLMNid of the mobile terminal is allowed. For instance, only if the determination is that the PLMNid is allowed, then the base station may send a positive handoff request response to the source base station, to facilitate further setup of the handoff. Whereas, if the determination is that determined PLMNid is not allowed, then the base station may transmit to the source base station a denial of the handoff request, possibly providing a response code that indicates the PLMNid was restricted.

Figure 3:
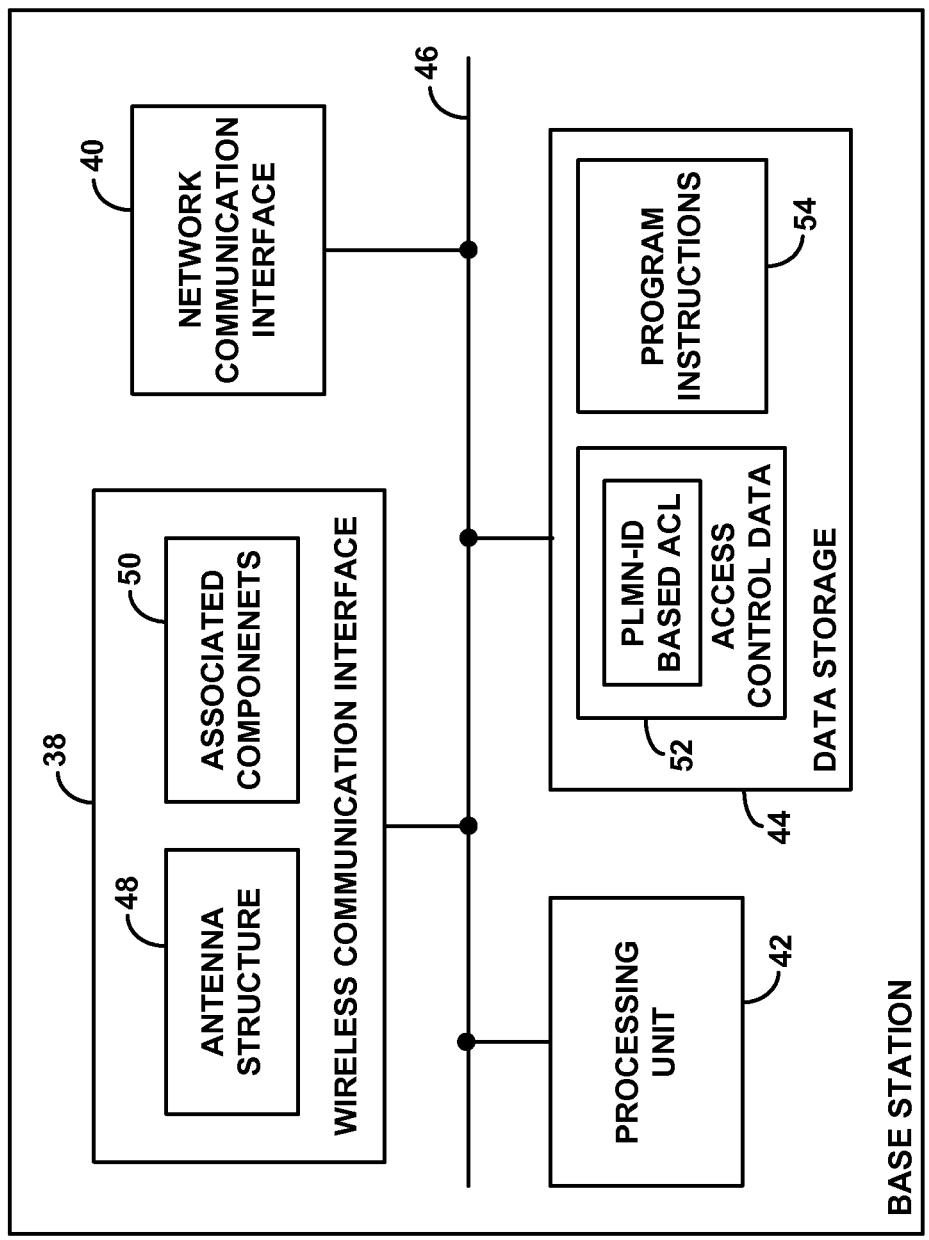
FIG. 3 is simplified block diagram of an example base station operable in accordance with the present method.

FIG. 3 is next a simplified block diagram of a base station, showing some of the components that may be included in the base station to facilitate implementation of the present method. By way of example, this figure could represent components of base station 12 and/or base station 14, to carry out features such as those described above.

As shown in FIG. 3, the base station may include a wireless communication interface 38, a network communication interface 40, a processing unit 42, and data storage 44, all of which may be coupled together by a system bus, network or other connection mechanism 46. Although these components are shown as discrete blocks in the figure, they may be integrated together or distributed to various extents.

As shown, wireless communication interface 38 may comprise an antenna structure 48, which may be tower mounted, and associated components 50, for engaging in air interface communication with mobile terminals. Network communication interface 40 may then comprise an Ethernet or other module providing for connectivity through which to communicate with other base stations and/or with other components of the communication system. Processing unit 42 may then comprise one or more general purpose processors (e.g., microprocessors) and/or special-purpose processors (e.g., digital signal processors and/or application specific integrated circuits). And data storage 44 may comprise one or more volatile and/or non-volatile storage components.

As shown, data storage 44 may hold access control data 52 and program instructions 54, although the access control data could alternatively be incorporated in the program instructions as program logic defining access control rules. As shown, the access control data 52 of the base station optimally comprises a PLMNid-based access control list, such as a PLMNid whitelist and/or a PLMNid blacklist. Further, in line with the discussion above, the base station may maintain multiple such access control lists, such as one for each operating frequency band of the base station, and the access control data 52 may correlate each such access control list with a respective frequency band to facilitate access control as discussed above.

The program instructions 54 may then be executable by the processing unit 42 to carry out various base station functions described herein. As such, the processing unit with these instructions may define a controller element of the base station, configured to carry out the described functions. For instance, the controller may be configured to receive a request to serve a mobile terminal, where the mobile terminal subscribes to a PLMN, and the request specifies a PLMNid of that PLMN, to refer to the PLMNid-based access control data to make a determination of whether the specified PLMNid is allowed, and to grant the request only if the determination is that the specified PLMNid is allowed. Alternatively, some or all aspects of this controller element of the base station could be provided in a form other than a programmed processing unit.

Figure 4:
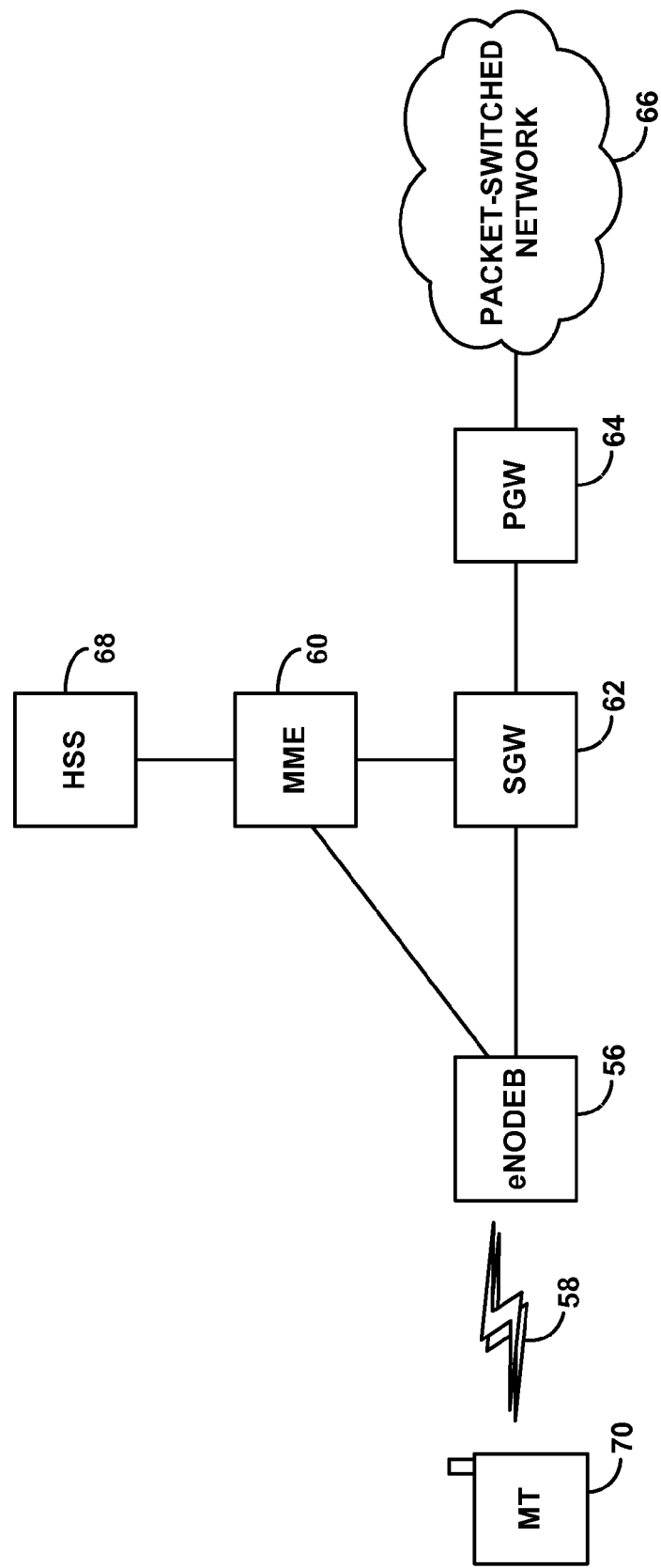
FIG. 4 is a simplified block diagram of an LTE network in which the present method may be implemented.

Finally, FIG. 4 is a simplified block diagram of an example LTE network, to help illustrate how the present method might apply in that scenario. As shown in FIG. 4, the example LTE network includes a representative LTE eNodeB 56 that radiates to provide one or more LTE coverage areas 58, such as separate coverage on each of various frequency bands. Further, the network includes an MME 60 having a communication interface with the eNodeB, and an SGW 62 having communication interfaces with the MME and the eNodeB, and a PGW 64 having a communication interface with the SGW and providing connectivity with a packet-switched network 66. As further shown, the MME 60 has a communication interface with an HSS 68 to facilitate querying for authorization to serve various mobile terminals.

With this arrangement, when an LTE mobile terminal 70 enters into coverage of eNodeB 56, the mobile terminal may transmit to the eNodeB an attach request that specifies the mobile terminal's IMSI including the mobile terminal's PLMNid. The eNodeB may the read the PLMNid from that attach request and refer to a PLMNid access control list stored by the eNodeB to determine whether the PLMNid is permitted. If the eNodeB thereby determines that the mobile terminal's PLMNid is permitted, then the eNodeB may forward the attach request along to the MME, and the MME may then interact with the HSS to further validate the mobile terminal for service and, if appropriate, may work to set up one or more bearers between the mobile terminal and the PGW, so that the eNodeB may then serve the mobile terminal. On the other hand, if the eNodeB thereby determines that the mobile terminal's PLMNid is not permitted, then the eNodeB may simply transmit in response to the mobile terminal an attach denial message, rather than forwarding the attach request on to the MME for attach processing, and so the eNodeB would then not serve the mobile terminal.

Furthermore, when an LTE mobile terminal is served by a source eNodeB, and eNodeB 56 receives from that source eNodeB a handoff request for the mobile terminal (e.g., via an inter-eNodeB interface known in LTE as the "X2" interface), that handoff request may carry an indication of the mobile terminal's PLMNid. In that case, eNodeB 56 may then similarly read the mobile terminal's PLMNid and then refer to a PLMNid access control list to determine whether the PLMNid is permitted. If the eNodeB thereby determines that the mobile terminal's PLMNid is permitted, then the eNodeB may continue with handoff processing, such as by sending to the source eNodeB a positive handoff response and proceeding with additional preparation for handoff of the mobile terminal to be served by the eNodeB. On the other hand, if the eNodeB thereby determines that the mobile terminal's PLMNid is not permitted, then the eNodeB may transmit in response to the source eNodeB a handoff denial, which may provide a cause code that indicates the PLMNid was restricted, in which case the handoff would then not occur.

Exemplary embodiments have been described above. It should be understood, however, that variations from these embodiments are possible, while remaining within the true spirit and scope of the invention.

We claim:

1. A method comprising:
wirelessly receiving into a base station from a mobile terminal a request for the base station to serve the mobile terminal, wherein the mobile terminal subscribes to a public land mobile network (PLMN) and the request specifies an identifier of the PLMN (PLMNid), wherein the base station provides service on multiple frequency bands, and wherein wirelessly receiving the request from the mobile terminal comprises receiving the request in a particular frequency band of the multiple frequency bands;
determining, by the base station, the PLMNid specified by the request;
making a determination, by the base station, of whether the determined PLMNid is allowed, wherein the base station maintains an access control list respectively for each of the frequency bands, including a particular access control list for the particular band, wherein each access control list is selected from the group consisting of a PLMNid whitelist and a PLMNid blacklist, and wherein making the determination by the base station of whether the determined PLMNid is allowed comprises (a) selecting, by the base station, the particular access control list based on the request having arrived on the particular frequency band and (b) referring, by the base station, to the selected access control list to make the determination; and
granting, by the base station, the request to serve the mobile terminal only if the determination is that the determined PLMNid is allowed.

2. The method of claim 1, wherein the request is an attach request seeking registration of the mobile terminal.

3. The method of claim 2, wherein the attach request carries a unique identifier of the mobile terminal, wherein the unique identifier of the mobile terminal includes the PLMNid, and wherein determining by the base station the PLMNid comprises reading by the base station the PLMNid from the unique identifier carried by the attach request.

4. The method of claim 3, wherein the unique identifier of the mobile terminal is an International Mobile Subscriber Identity (IMSI), and wherein the PLMNid is included as a first six digits of the IMSI.

5. The method of claim 2, further comprising:
maintaining, by the base station, an access control list selected from the group consisting of (i) a PLMNid whitelist and (ii) a PLMNid blacklist,
wherein making the determination by the base station of whether the determined PLMNid is allowed comprises referring, by the base station, to the maintained access control list to make the determination.

6. The method of claim 2, further comprising:
forwarding the attach request, by the base station, to a mobility management entity only if the determination is that the determined PLMNid is allowed.

7. The method of claim 2, further comprising:
if the determination is that determined PLMNid is not allowed, then wirelessly transmitting in response from the base station to the mobile terminal a denial of the attach request.

8. A base station comprising:
an antenna structure configured to communicate over an air interface with mobile terminals, wherein the base station is configured to provide service via the antenna structure on multiple frequency bands; and
a controller,
wherein the controller is configured to receive from a mobile terminal a request to serve the mobile terminal, wherein the mobile terminal subscribes to a public land mobile network (PLMN), wherein the request specifies an identifier of the PLMN (PLMNid) to which the mobile terminal subscribes, and wherein the request arrives wirelessly at the antenna structure on a particular one of the frequency bands,
wherein the base station maintains a set of PLMNid access control data respectively for each of the frequency bands,
wherein the controller is configured to (a) select a particular set of PLMIid access control data based on the request having arrived on the particular frequency band and (b) refer to selected set of PLMNid access control data to make a determination of whether the specified PLMNid is allowed, and
wherein the controller is configured to grant the request only if the determination is that the specified PLMNid is allowed.

9. The base station of claim 8, wherein the request is an attach request.

10. The base station of claim 8, wherein each set of PLMNid access control data comprises at least one list selected from the group consisting of (i) a PLMNid whitelist and (ii) a PLMNid blacklist.

11. A communication system comprising:
an eNodeB having an antenna structure for communicating wirelessly with mobile terminals, a processing unit, data storage, and program instructions stored in the data storage and executable by the processing unit to carry out functions; and
a Mobility Management Entity (MME) in network communication with the eNodeB and with a Home Subscriber Server (HSS),
wherein, when the eNodeB receives wirelessly from a mobile terminal via the antenna structure an attach request seeking to register the mobile terminal for service with the eNodeB, the eNodeB extracts from the attach request a public land mobile network identifier (PLMNid) indicating a public land mobile network (PLMN) to which the mobile terminal subscribes, and the eNodeB makes a determination of whether the extracted PLMNid is allowed,
wherein the eNodeB provides service on multiple frequency bands, wherein the eNodeB receives the attach request from the mobile terminal on a particular one of the frequency bands, and wherein making the determination of whether the extracted PLMNid is allowed comprises (a) selecting PLMNid access control data based on the particular frequency band on which the eNodeB received the attached request, and (b) referring to the selected PLMNid access control data to make the determination, wherein (a) if the determination is that the extracted PLMNid is allowed, then the eNodeB forwards the attach request along to the MME for processing, and the MME works with the HSS to validate the mobile terminal for service in the system, but (b) if the determination is that the extracted PLMNid is not allowed, then the eNodeB instead sends a denial response via the antenna structure to the mobile terminal and does not forward the attach request along to the MME for processing.

12. The communication system of claim 11, wherein the eNodeB maintains the selected PLMNid access control data, wherein the selected PLMNid access control data comprises data selected from the group consisting of (i) a specification of at least one PLMNid that is allowed and (ii) a specification of at least one PLMNid that is not allowed.

13. The communication system of claim 12, wherein the eNodeB is a first eNodeB, wherein the system further comprises a second eNodeB, and wherein the second eNodeB is configured to apply the PLMNid access control data with respect to a handoff request from the second eNodeB as well.

* * * * *